(12) United States Patent
Ravishankar et al.

(10) Patent No.: US 10,810,341 B1
(45) Date of Patent: Oct. 20, 2020

(54) METHOD AND SYSTEM FOR MAKING PIN-TO-PIN SIGNAL CONNECTIONS

(71) Applicant: Xilinx, Inc., San Jose, CA (US)

(72) Inventors: Chirag Ravishankar, Erie, CO (US); Davis Moore, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/443,244

(22) Filed: Jun. 17, 2019

(51) Int. Cl.
*G06F 30/30* (2020.01)
*G06F 30/394* (2020.01)
*G06F 111/04* (2020.01)

(52) U.S. Cl.
CPC ............ *G06F 30/394* (2020.01); *G06F 30/30* (2020.01); *G06F 2111/04* (2020.01)

(58) Field of Classification Search
CPC ..... G06F 30/394; G06F 30/30; G06F 2111/04
See application file for complete search history.

(56) References Cited

U.S. PATENT DOCUMENTS

| 5,140,526 | A  | * | 8/1992  | McDermith | ....... | G06Q 30/0283 |
|           |    |   |         |           |         | 705/28       |
| 7,992,121 | B2 | * | 8/2011  | Gupta     | ........ | G06F 30/327 |
|           |    |   |         |           |         | 716/128     |
| 8,196,082 | B1 |   | 6/2012  | Kannan    |         |             |
| 8,549,454 | B1 |   | 10/2013 | Kong et al. |       |             |
| 8,661,401 | B1 | * | 2/2014  | Ogami     | ........ | G06F 30/39  |
|           |    |   |         |           |         | 716/139     |
| 8,739,103 | B1 | * | 5/2014  | Dutta     | ........ | G06F 30/39  |
|           |    |   |         |           |         | 716/119     |
| 9,064,077 | B2 | * | 6/2015  | Samadi    | ........ | G06F 30/392 |
| 9,147,030 | B2 | * | 9/2015  | Yu        | ........ | G06F 30/394 |
| 9,454,626 | B2 | * | 9/2016  | Iyer      | ........ | G06F 30/327 |
| 9,715,572 | B2 | * | 7/2017  | Berry     | ........ | G06F 30/394 |
| 9,892,226 | B2 | * | 2/2018  | Hsu       | ........ | G06F 30/392 |
| 2008/0184184 | A1 | * | 7/2008 | McCracken | ....... | G06F 30/30  |
|           |    |   |         |           |         | 716/113     |
| 2008/0276214 | A1 | * | 11/2008 | Bartley  | ........ | H01L 23/50  |
|           |    |   |         |           |         | 716/137     |
| 2010/0122228 | A1 | * | 5/2010 | McCracken | ........ | G06F 30/39  |
|           |    |   |         |           |         | 716/113     |
| 2012/0036491 | A1 | * | 2/2012 | Ramji    | ........ | G06F 30/392 |
|           |    |   |         |           |         | 716/122     |
| 2015/0220674 | A1 | * | 8/2015 | Mihal    | ........ | G06F 30/392 |
|           |    |   |         |           |         | 716/113     |
| 2016/0232271 | A1 | * | 8/2016 | Lim      | ........ | G06F 30/394 |
| 2017/0199955 | A1 | * | 7/2017 | Won      | ........ | G06F 30/398 |
| 2017/0212857 | A1 | * | 7/2017 | Keckler  | ........ | G06F 13/409 |
| 2017/0316143 | A1 | * | 11/2017 | Lu      | ........ | G06F 30/394 |
| 2019/0188354 | A1 | * | 6/2019 | Won      | ........ | G06F 30/398 |

* cited by examiner

*Primary Examiner* — Stacy Whitmore
(74) *Attorney, Agent, or Firm* — Crawford Maunu PLLC

(57) ABSTRACT

Circuit pin constraints input to a design tool specify respective sets of circuit pins belonging to circuit blocks, and input interface pin constraints specify respective sets of interface pins belonging to instances of an interface circuit. The design tool generates pin solutions, and each pin solution includes pin assignments of the circuit pins to the interface pins. The design tool applies an objective function to the pin solutions and selects one pin solution that satisfies the objective function. The design tool then specifies in a circuit design, connections between the circuit pins and the interface pins according to the selected pin solution.

20 Claims, 5 Drawing Sheets

METHOD AND SYSTEM FOR MAKING PIN-TO-PIN SIGNAL CONNECTIONS

TECHNICAL FIELD

The disclosure generally relates to determining connections between pins of hard circuit blocks and pins of instances of an interface circuit.

BACKGROUND

Prior approaches to determining assignments to be made between pins of hard circuit blocks and pins of interface circuitry have become exceedingly difficult due to the integration of increasing numbers of hard circuit blocks, programmable logic, and programmable interconnect circuitry in system-on-chips (SOCs). In an exemplary SOC, programmable interconnect circuitry of field programmable gate array (FPGA) logic is used to carry signals between configurable logic blocks (CLBs) and hard circuit blocks such as digital signal processor (DSPs), block random access memories (BRAMs), on-chip memory controllers, input/output circuit blocks, etc. Each of the blocks of circuitry can be connected to the programmable interconnect circuitry through tiles of interface circuits. Each tile can have an identical (or functionally equivalent) instance of an interface circuit that provides input pins (input to the block), output pins (output from the block), and control pins.

The process of determining pin assignments in prior SOCs could be performed manually as the SOC had only a small number of hard circuit blocks and the interface circuitry imposed only a small number of constraints. The pin assignments could be manually managed by individual hard circuit design teams and the interconnect design team. The constraints in specifying pin-to-pin connections consisted of connecting input pins of the hard circuits to input pins of the interface circuits, connecting control pins and output pins of the hard circuit to logic output pins of the interface circuit, and minor constraints to improve system performance and signal routability.

Though prior approaches to determining pin assignments could be performed manually, the process could still be time consuming. Meetings between design groups to decide on pin assignments takes time away from other development activities, and some changes could be subjective and even suboptimal. The large number of hard circuit blocks in current SOCs makes prior approaches untenable.

SUMMARY

A disclosed method includes inputting circuit pin constraints and interface pin constraints to a design tool executing on a computer system. The circuit pin constraints specify respective sets of a plurality of circuit pins belonging to a plurality of circuit blocks, respectively, in a circuit design, and the interface pin constraints specify respective sets of a plurality of interface pins belonging to a plurality of instances of an interface circuit, respectively, in the circuit design. The design tool generates a plurality of pin solutions. Each pin solution includes a set of pin assignments of the plurality of circuit pins to the plurality of interface pins. The design tool applies a first objective function to the plurality of pin solutions and selects one pin solution of the plurality of pin solutions that satisfies the first objective function. The design tool specifies in the circuit design, connections between the plurality of circuit pins and the plurality of interface pins according to the one of the plurality of pin solutions.

A disclosed system includes one or more computer processors configured to execute program code, and a memory arrangement coupled to the one or more computer processors. The memory arrangement is configured with instructions of a design tool that when executed by the one or more computer processors cause the one or more computer processors to perform operations including inputting circuit pin constraints and interface pin constraints. The circuit pin constraints specify respective sets of a plurality of circuit pins belonging to a plurality of circuit blocks, respectively, in a circuit design, and the interface pin constraints specify respective sets of a plurality of interface pins belonging to a plurality of instances of an interface circuit, respectively, in the circuit design. The design tool generates a plurality of pin solutions. Each pin solution includes a set of pin assignments of the plurality of circuit pins to the plurality of interface pins. The design tool applies a first objective function to the plurality of pin solutions and selects one pin solution of the plurality of pin solutions that satisfies the first objective function. The Design tool specifies in the circuit design, connections between the plurality of circuit pins and the plurality of interface pins according to the one of the plurality of pin solutions.

Other features will be recognized from consideration of the Detailed Description and Claims, which follow.

BRIEF DESCRIPTION OF THE DRAWINGS

Various aspects and features of the methods and system will become apparent upon review of the following detailed description and upon reference to the drawings in which.

DETAILED DESCRIPTION

Figure 1:
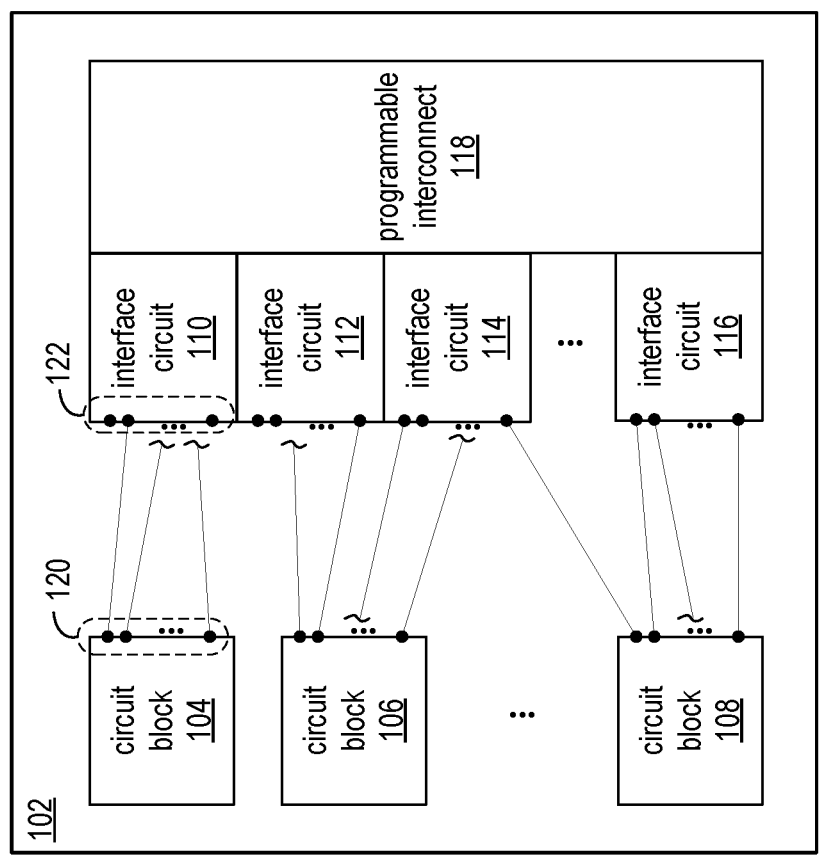
FIG. 1 shows an exemplary system-on-chip (SOC) having multiple hard circuit blocks connected to instances of an interface circuit.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems provide approaches for determining assignments and making signal connections between pins of hard circuit blocks and pins of instances of an interface circuit. The instances of the interface circuit provide flexibility in establishing specific signal routes between the hard circuit blocks and source or destination circuits connected to programmable interconnect. As used herein, "hard circuit blocks" have a fixed set of input, output, and control pins that need to be connected to signal routing circuitry through instances of an interface circuit. Examples of hard circuit blocks include configurable logic blocks (CLBs) and hard circuit blocks such as digital signal processor (DSPs), block random access memories (BRAMs), on-chip memory controllers, input/output circuit blocks, etc. In an exemplary application, each instance of an interface circuit can provide connections to the programmable interconnect of an SOC.

The disclosed methods and systems involve a design tool operating on an SOC circuit design to establish connections between pins of hard circuit blocks and pins of instances of an interface circuit of the SOC. The design tool inputs constraints associated with pins of the hard circuit blocks ("circuit pins") and constraints associated with pins of the instances of the interface circuit ("interface pins"). The circuit pin constraints can identify the hard circuit block to which each circuit pin belongs, and the interface pin constraints can identify the instance of the interface circuit to which each interface pin belongs.

Additional interface pin constraints can make determining pin assignments exceeding difficult. For example, an exemplary interconnect architecture can restrict assignment of pins associated with control sets to certain subsets of interconnect pins. A "control set" is a set of register control signals, such as clock, set/reset and clock-enable, that are used together in controlling one or more registers. Constraints may also specify use modes of circuit pins, which permit assignments of pins having different associated control sets to the same group of interface pins as long as the control sets are not used concurrently by the hard circuit block.

The disclosed approaches determine optimal pin assignments by generating multiple feasible solutions and selecting one of the solutions that satisfies an objective function, such as routability or system performance. The selection of an optimal solution can be accomplished by the design tool executing an integer linear programming algorithm or a Boolean satisfiability algorithm, for example. Each solution generated by the design tool specifies a set of assignments of the circuit pins to the interface pins, and in each set of assignments, the interface pins of any instance of the instances of the interface circuit are assigned to circuit pins of one or more of the circuit blocks. The solution that best satisfies the objective function is used by the design tool to specify pin-to-pin connections between the circuit pins and the interface pins in the circuit design.

FIG. 1 shows an exemplary system-on-chip (SOC) 102 having multiple hard circuit blocks 104, 106, . . . , 108 connected to instances 110, 112, 114, . . . , 116 of an interface circuit. FIG. 1 shows connections in a completed SOC. The disclosed approaches determine which circuit pins are to be connected to which interface pins for purposes of routing signal lines during the routing phase of the design flow and thereafter making an integrated circuit having the specified connections and routes. Circuit pins 120 are the circuit pins of hard circuit block 104 and are connected to the interface pins 122 of the instance 110 of the interface circuit. The lines that connect the circuit pins to the interface pins represent signal lines that connect the pins.

The exemplary SOC 102 includes programmable interconnect circuitry 118 that is configurable to establish signal paths between the circuit blocks 104, 106, . . . , 108. The programmable interconnect 118 is exemplified by the interconnect circuitry found in field programmable gate arrays (FPGAs). The instances 110, 112, 114, . . . , 116 of the interface circuit provide paths to carry signals between the circuit blocks and the programmable interconnect.

The SOC 102 illustrates the connections made between circuit pins and interface pins according to one solution of pin-to-pin assignments. The illustrated solution can be one solution selected from many solutions generated according to the disclosed approaches. The particular solution has connections between the circuit pins of circuit block 104 and the interface pins of instance 110 of the interface circuit, connections between the circuit pins of circuit block 106 and the interface pins of instances 112 and 114 of the interface circuit, . . . , and connections between the circuit pins of circuit block 108 and the interface pins of instances 114 and 116 of the interface circuit.

According to one constraint, the set of interface pins of one instance of the interface circuit can be assigned to circuit pins of different circuit blocks, such as the connections between the circuit pins of circuit blocks 106 and 108 and the instance 114 of the interface circuit. However, an interface pin cannot be assigned to two circuit pins.

The pin-to-pin connections illustrated on the SOC 102 can be the result of various constraints imposed on the connections based on limitations and needs of the circuit blocks 104, 106, . . . , 108 and instances 110, 112, 114, . . . , 116 of the interface circuit. One constraint can specify the respective circuit pins that belong each circuit block, specify the respective set of interface pins that belong to each instance of the interface circuit, and specify any association(s) of a control set(s) with a circuit pin(s).

Another constraint can specify connections between the circuit pins of a particular one of the circuit blocks and the interface pins of a particular one or more of the instances of the interface circuit. For example, a constraint can restrict the design tool to establish connections for the circuit pins of circuit block 104 to the interface pins of instance 110 of the interface circuit.

Figure 2:
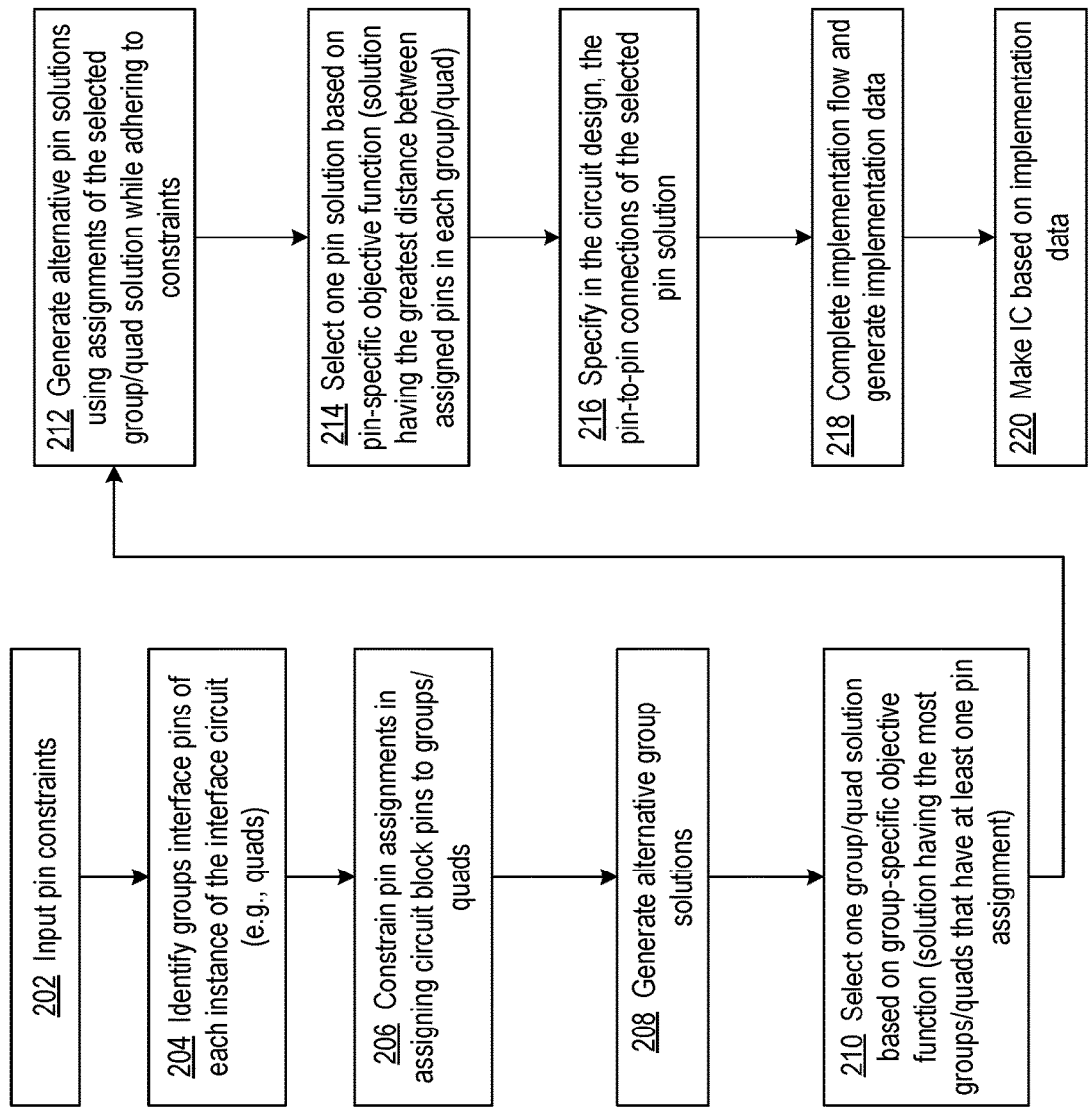
FIG. 2 shows a flowchart of an exemplary process of making pin-to-pin signal connections between circuit pins of circuit blocks and interface pins of instances of an interface circuit based on an SOC circuit design.

FIG. 2 shows a flowchart of an exemplary process of making pin-to-pin signal connections between circuit pins of circuit blocks and interface pins of instances of an interface circuit based on an SOC circuit design. The disclosed process is generally a two-step process that divides a problem into two phases to achieve a legal and optimized solution, while significantly reducing the computational requirements. The methods and systems are adaptable to changing architectures of either a hard circuit block or the interface circuit. If the circuit block requirements change, the input constraints can be changed to generate a new legal and optimized pin assignment for the same interconnect circuit architecture. Similarly, if the interconnect architecture is modified, the interconnect pin constraints can be adjusted to generate valid pin assignments for the hard circuit blocks without consulting with design teams of the hard circuit blocks.

At block 202, a design tool inputs constraints associated with the circuit pins of the circuit blocks and the interface pins of the instances of the interface circuit. Some examples of general constraints include restrictions placed by the interconnect architecture on the assignment of pins associated with control sets to certain subsets of interconnect pins.

Constraints may also specify use modes of circuit pins, which permit assignments of pins having different associated control sets to the same group of interface pins as long as the control sets are not used concurrently by the hard circuit block. The use modes allow a circuit pin to be used differently in different configuration modes. On the interface instance side, the interconnect architecture allows different uses, but requires that all pins that have the same behavior in all modes be connected to the same instance of the interface circuit. For example, if a circuit block has a first set of pins that have ctrlsetA in mode A, ctrlsetB in modeB, and ctrlsetC in mode C, and the circuit block has a second set of pins that have ctrlsetA in mode A, ctrlsetC in modeB and the second set of pins are not used in modeC, the two sets of circuit pins cannot mixed on the same instance of the interface circuit even though in modeA, the circuit pins match.

A number of different circuit pin constraints can be used by the design tool to restrict pin assignments. Basic circuit pin constraints specify the number of input pins, output pins, and control pins to be connected, identify the circuit block to which each circuit pin belongs, and identify the pin as being used for input, output, or register control. Additional circuit pin constraints can specify the side of the physical circuit block on which the pin is located (if the circuit pins are on opposing sides), the relationship of an input pin to a control set, a number of instances of the interface circuit to which connections of all circuit pins should be limited, a range of identifiers of instances of the interface circuit to which a circuit pin can be connected, the identifier of a specific instance of the interface circuit to which a circuit pin can be connected, a stepping constraint that replicates an assignment of a circuit pin to one instance of the interface circuit as an assignment of another circuit pin on an instance of the interface circuit that is some offset away from the one instance, a mirroring constraint that replicates constraints of a circuit pin on one side of a circuit block on the corresponding circuit pin on the other side of the circuit block, and a bus name and order of circuit pins of the bus. Note that the mirroring constraint can also be applied to circuit pins on the same side of the circuit block by reorienting the line of symmetry horizontally. Another constraint is that a circuit pin is to remain unassigned, and therefore unconnected to an interface pin. Constraints associated with the instances of the interface circuit can specify the set of interface pins belonging to each instance, and the number of interface pins available for input signals, output signals, and register control signals on each instance.

Other useful constraints that can be used to restrict assignments can include a restriction that a circuit pin can be connected only to an interface pin that connects to a particular metal layer of the SOC. Also, an application-specific system level performance requirement can be input as a constraint rather than an objective so that the generated pin assignment satisfies the performance requirement.

At block 204, the design tool identifies groups of interface pins of each of the instances of the interface circuit. In an exemplary application each interface circuit has four groups or "quads" of interface pins.

Figure 3:
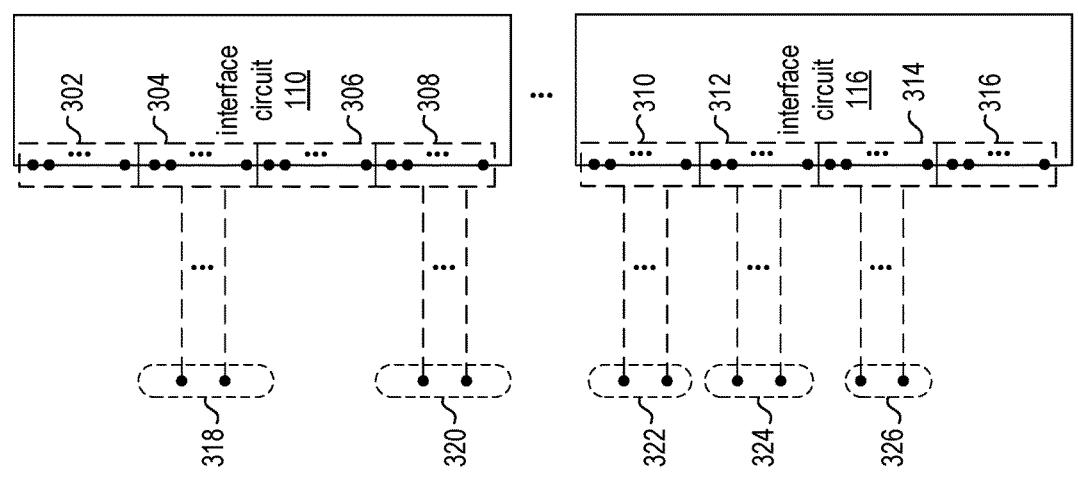
FIG. 3 illustrates groups of pins of instances of an exemplary interface circuit.

FIG. 3 illustrates groups of pins of instances 110 and 116 of an exemplary interface circuit. Each instance has four groups of interface pins, and the groups are indicated by dashed boxes surrounding the groups. Instance 110 of the interface circuit is shown as having groups 302, 304, 306, and 308, and instance 116 of the interface circuit is shown as having groups 310, 312, 314, and 316.

Returning now to FIG. 2, at block 206 pin assignments are constrained by group constraints. According to one group constraint, each group can have 0 or 1 control set assigned, which can be formally stated as a constraint for the algorithm that generates solutions as:

$$\forall q, q \in \text{quads}: \sum_{c \in \text{ctrls}} q_c \leq 1$$

Note that "quad" is used instead of "group" in the formal specification of the constraints. The constraint reads, for every quad, q, where q is an element of the set of quads, the total number control sets assigned to the quad is less than or equal to 1 ($q_c$ denotes control set c assigned to quad q).

According to another constraint, for every control set, there must exist some assignment of the control set to a group/quad, which can be formally stated as a constraint for the algorithm as:

$$\forall c, c \in \text{ctrls}, \sum_{q \in \text{quads}} q_c \geq 1$$

The constraint allows a control set to be assigned to multiple groups/quads of interface pins.

According to another constraint, the total number of circuit pins of a given type assigned to a group/quad cannot exceed the number of interface pins of that type available in the group/quad, which can be formally stated as a constraint for the algorithm as:

$$\forall q, q \in \text{quads}, \forall t, t \in \{imux, ctrl, \text{logic\_out}\}: \sum_{p, p \in \text{pins} \cap \text{type}(p)=\text{type}} q\_t\_p \leq \text{capacity}(t)$$

According to another constraint, every circuit pin must be assigned to one and only one group/quad, which can be formally stated as a constraint for the algorithm as:

$$\forall p, p \in \text{pins}, \sum_{q \in \text{quads}} q_{\text{type}(p)_p} = 1$$

Note that "p" refers to a circuit pin.

According to another constraint, for each circuit pin that has an associated control set, if the circuit pin is assigned to a group/quad, then the associated control set must be assigned to that same group/quad, which can be formally stated as a constraint for the algorithm as:

$$\forall q, q \in \text{quads}, \forall p, p \in \text{pins}: q\_p \rightarrow q\_\text{ctrl}(p)$$

According to another constraint, a circuit pin is assigned to a specific group/quad identified by the constraint, which can be formally stated as a constraint for the algorithm as:

$$\forall q, q \in \text{quads}, \forall c, c \in \text{ctrls}, \forall t, t \in \{imux, ctrl, \text{logic\_out}\},$$
$$\forall p, p \in \text{pins} \cap \text{type}(p) \neg \in c: q_c \neg \rightarrow q\_t\_p$$

Instances of the interface circuit can have associated numerical identifiers that can be used in specifying and adhering to specific group/quad constraint for a circuit pin.

The instance identifiers of instances of the interface circuit can also be used for a constraint that limits assignment of a circuit pin to a range of instances of the interface circuit. For example, referring to FIG. 1 the circuit pins of circuit block 106 can a constraint that limits assignment to interface pins of instances within the range of instance identifiers of instances 112 and 114.

Analysis of the constraints can simplify the constraints and significantly reduce computation and runtime. For the constraints mentioned above, if there are variables that will always exist (e.g., a particular $q_c$ that will always exist because of an explicit constraint by the designer of the circuit block), then formation of complex variables that will never be true can be avoided. Instead, a simple variable can be created and the value set to 1. Similarly, for variables that will never exist, no variable need be formulated. For example, if a pin is constrained to a particular group/quad, then the following summation constraint need not be created:

$$\forall\, p,\, p \in \text{pins},\ \sum_{q \in quads} q_{type(p)_p} = 1$$

A simple variable of $q_{type(p)_p}$ set to 1 can be used instead. The design tool can survey the input constraints and replace complex constraints with simple variables.

At block 208 the design tool generates multiple alternative group solutions. Each group solution includes a set of assignments, and each set of assignments includes an assignment of each circuit pin to one of the groups of the instances of the interface circuit. Each group solution satisfies the constraints described above. FIG. 3 illustrates assignments of circuit pins to groups/quads. The assignments are illustrated as dashed lines, with circuit pins 318 assigned to group/quad 304, circuit pins 320 assigned to group/quad 308, circuit pins 322 assigned to group/quad 310, circuit pins 324 assigned to group/quad 312, and circuit pins 326 assigned to group 314. The assignments of circuit pins to groups/quads effectively establish assignments of circuit pins to particular instances of the interface circuit.

The computational resources required to determine a legal and optimal solution of pin-to-pin assignments can be significantly reduced by deleting group solutions having assignments of circuit pins to interface pins of instances that are outside the range permitted by the constraint.

Additional aspects of the design tool that can improve performance and/or reduce computational requirements is multithreading sets of problems that can be solved simultaneously. For example, separate thread can generate solutions for the circuit pins on the left and right sides of the circuit block if there are exclusive restrictions, such as an exclusive set of pins constrained to each side. Similarly, separate threads can generate solutions for range constraints found by the design tool to be exclusive.

Returning now to FIG. 2, at block 210 the design tool applies an objective function to the alternative group solutions in order to select the one of the group solutions that best satisfies the objective function. As one example, the objective function can maximize the number of groups/quad having at least one assigned control set, because a control set assignment to a group/quad implies that there is at least one circuit pin assigned to that quad. For example, in applying integer linear programming (ILP algorithm, the objective function maximizes the sum of the $q_c$ variables. This objective is sufficiently compact that the ILP algorithm (or comparable algorithm) can solve the objective and provide an exact maximal answer.

Beginning at block 212, the design tool uses the selected group solution to determine specific assignments of circuit pins to interface pins. At block 212, the design tool generates multiple alternative pin solutions from the selected group solution. Each pin solution includes a set of assignments of the circuit pins to the interface pins, consistent with the group/quad assignments of the group solution.

At block 214, the design tool applies an objective function to the alternative pin solutions and selects one of the pin solutions that satisfies the objective function. In one exemplary approach, the objective function applied to the pin solutions maximizes the distance between assigned ones of the interface pins. For every possible assignment of a circuit pin to an interface pin in the group/quad indicated by the selected group solution, the objective function permutes on every other possible assignment and assigns the distance between the two assignments as an integer variable, which can be referred to as a "pairwise variable" that indicates two assignments. The objective function specifies an implication that states, if a certain pair of circuit pin to interface pin assignment is chosen, then the corresponding pairwise variable must also be chosen. The objective function then maximizes the sum of every pairwise variable.

Though the approach using pairwise variables can provide the exact maximization of the physical distances, the approach may require too many computational resources to be feasible. Were the objective function to be applied to all possible circuit pin-to-interface pin assignments for any group/quad, the number of variables would be too great for reasonable runtimes. For a group/quad size of n, the number of variables would be n!. If n=24, for example, the number of variables is $6.2*10^{23}$, which may be too great to compute within available time constraints.

In an alternative approach, the objective function can compute a respective distance metric for each pin solution, and the pin solution having the greatest distance metric is the selected pin solution. The distance metric can be the greatest of sums of all distances in all groups/quads, the greatest median distance, or the greatest mean distance, for example.

At block 216, the design tool specifies in the circuit design, the pin-to-pin connections specified in the selected solution. The circuit design implementation flow continues and can be completed with the design tool generating circuit implementation data at block 218.

The implementation flow can include further place-and-route in conjunction with optimization operations. The generated implementation can include configuration data for an FPGA or data from which an SOC circuitry can be fabricated. At block 220, a circuit can be made by way of configuring a programmable IC with the configuration data or fabricating an SOC from the implementation data, thereby creating a circuit that operates according to the resulting circuit design.

Figure 4:
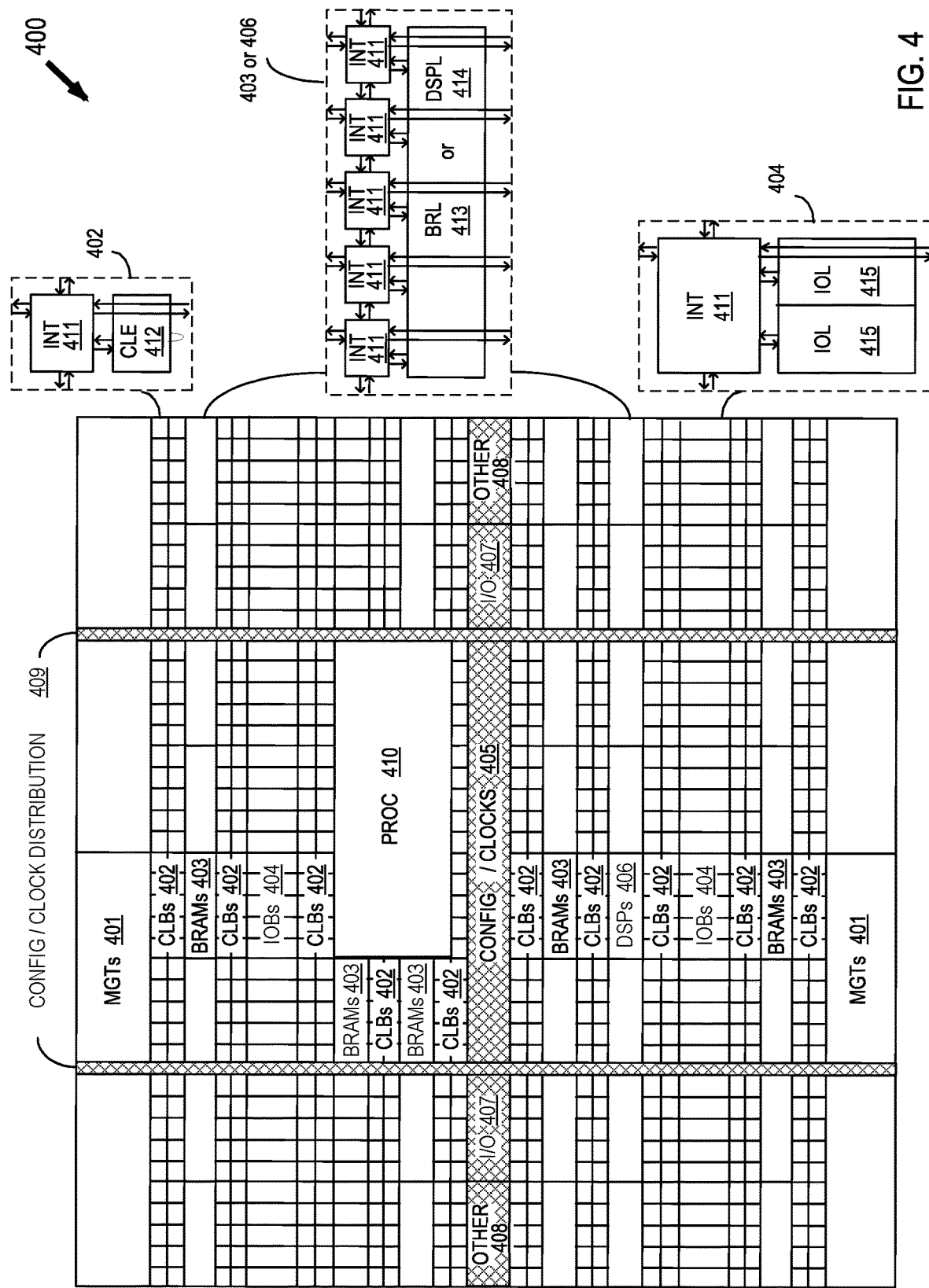
FIG. 4 shows a programmable integrated circuit (IC), which may also be referred to as a System On Chip (SOC) that includes field programmable gate array logic (FPGA) along with other programmable resources.

FIG. 4 shows a programmable integrated circuit (IC) 400, which may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Figure 5:
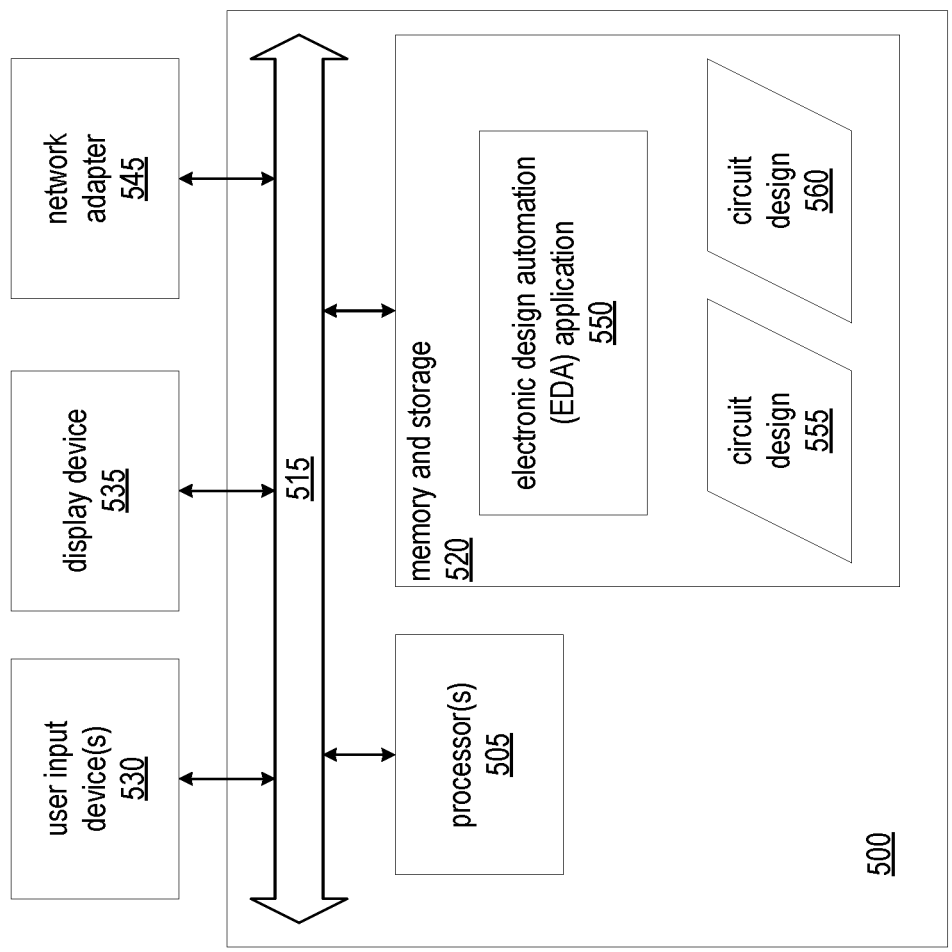
FIG. 5 is a block diagram illustrating an exemplary data processing system.

FIG. 5 is a block diagram illustrating an exemplary data processing system (system) 500. System 500 is an example of an EDA system. As pictured, system 500 includes at least one processor circuit (or "processor"), e.g., a central processing unit (CPU) 505 coupled to memory and storage arrangement 520 through a system bus 515 or other suitable circuitry. System 500 stores program code and circuit design 100 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an EDA application 550. EDA application 550, being implemented in the form of executable program code, is executed by processor(s) 505. As such, EDA application 550 is considered part of system 500. System 500, while executing EDA application 550, receives and operates on SOC circuit design 555. In one aspect, system 500 performs a design flow on circuit design 550, and the design flow may include synthesis, mapping, placement, routing, and the application pin-to-pin assignment processes as described herein. System 500 generates a modified version of SOC circuit design 555 as circuit design 560, which includes circuit pin-to-interface pin assignments.

EDA application 550, SOC circuit design 555, circuit design 560, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Some implementations are directed to a computer program product (e.g., nonvolatile memory device), which includes a machine or computer-readable medium having stored thereon instructions which may be executed by a computer (or other electronic device) to perform these operations/activities Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for determining pin-to-pin assignments. Other aspects and features will be apparent to those skilled in the art from consideration of the specification. It is intended that the specification and drawings be considered as examples only, with a true scope of the invention being indicated by the following claims.

What is claimed is:

1. A method comprising:
    inputting circuit pin constraints and interface pin constraints to a design tool executing on a computer system, wherein:
        the circuit pin constraints specify respective sets of a plurality of circuit pins belonging to a plurality of circuit blocks, respectively, in a circuit design; and
        the interface pin constraints specify respective sets of a plurality of interface pins belonging to a plurality of instances of an interface circuit, respectively, in the circuit design;
    generating a plurality of pin solutions by the design tool, wherein each pin solution includes a set of pin assignments of the plurality of circuit pins to the plurality of interface pins;
    applying a first objective function to the plurality of pin solutions by the design tool;
    selecting by the design tool, one pin solution of the plurality of pin solutions that satisfies the first objective function; and
    specifying in the circuit design by the design tool, connections between the plurality of circuit pins and the plurality of interface pins according to the one of the plurality of pin solutions.

2. The method of claim 1, wherein the first objective function maximizes a distance between assigned interface pins of the plurality of interface pins, the assigned interface pins being ones of the plurality of interface pins that are assigned to ones of the plurality of circuit pins.

3. The method of claim 1, further comprising:
    assigning by the design tool before generating the plurality of pin solutions, each circuit pin of the plurality of circuit pins to one instance of the plurality of instances of the interface circuit; and
    wherein the generating the plurality of pin solutions includes assigning each circuit pin to an interface pin of the one instance of the interface circuit.

4. The method of claim 1, wherein each instance of the plurality of instances of the interface circuit includes a plurality of groups of interface pins of the plurality of interface pins, and the method further comprising:
    generating a plurality of group solutions by the design tool before generating the plurality of pin solutions, wherein each group solution includes a set of group assignments and each set of group assignments includes an assignment of each circuit pin of the plurality of circuit pins to one group of the plurality of groups of interface pins of one instance of the plurality of instances of the interface circuit;
    applying a second objective function to the plurality of group solutions by the design tool;
    selecting by the design tool, one group solution of the plurality of group solutions that satisfies the second objective function; and
    wherein the generating the plurality of pin solutions includes assigning each circuit pin of the plurality of circuit pins to an interface pin of the group of interface pins of the one instance of the plurality of instances of the interface circuit specified in the one group solution.

5. The method of claim 4, wherein the second objective function maximizes a number of groups of the plurality of groups of interface pins of the plurality of instances of the interface circuit having assigned circuit pins.

6. The method of claim 4, wherein the generating the plurality of group solutions includes:
    identifying each constrained circuit pin of the plurality of circuit pins, wherein each constrained circuit pin has an associated control set; and
    assigning ones of the plurality of circuit pins indicated by the associated control set to the one group of interface pins to which the constrained circuit pin is assigned.

7. The method of claim 1, wherein:
    the plurality of instances of the interface circuit have associated numerical identifiers, and the circuit pin constraints specify for one or more of the plurality of circuit pins a range of the numerical identifiers; and
    the generating the plurality of pin solutions includes restricting the assignment of each circuit pin of the one or more circuit pins to interface pins of an instance of the plurality of instances of the interface circuit having a numerical identifier in the range of numerical identifiers.

8. The method of claim 1, wherein:
    the plurality of instances of the interface circuit have associated numerical identifiers, and the circuit pin constraints specify for one or more of the plurality of circuit pins, one of the numerical identifiers; and
    the generating the plurality of pin solutions includes restricting the assignment of each circuit pin of the one or more circuit pins to interface pins of an instance of the plurality of instances of the interface circuit having the one of the numerical identifiers.

9. The method of claim 1, wherein:
    the circuit pin constraints restrict one of the circuit pins to a specific pin assignment to one of the interface pins; and
    the generating the plurality of pin solutions includes:
        determining whether or not the circuit pin constraints indicate the specific pin assignment; and
        limiting the generating of the pin solutions to pins solutions having the specific pin assignment.

10. The method of claim 1, wherein:
    the circuit pin constraints specify a first set of restrictions and a second set of restrictions, and possible pin assignments compliant with the first set of restrictions are exclusive of possible pin assignments compliant with the second set of restrictions; and
    the generating the plurality of pin solutions includes:
        generating a first set of assignments in a pin solution of the plurality of pin solutions by a first execution thread of the design tool, the first set of assignments compliant with the first set of restrictions; and
        generating a second set of assignments in a pin solution of the plurality of pin solutions by a second execution thread of the design tool executing concurrently with the first execution thread, the first set of assignments compliant with the first set of restrictions.

11. A system comprising:
    one or more computer processors configured to execute program code; and
    a memory arrangement coupled to the one or more computer processors, wherein the memory arrangement is configured with instructions of a design tool that when executed by the one or more computer processors cause the one or more computer processors to perform operations including:

inputting circuit pin constraints and interface pin constraints, wherein:
  the circuit pin constraints specify respective sets of a plurality of circuit pins belonging to a plurality of circuit blocks, respectively, in a circuit design; and
  the interface pin constraints specify respective sets of a plurality of interface pins belonging to a plurality of instances of an interface circuit, respectively, in the circuit design;
generating a plurality of pin solutions, wherein each pin solution includes a set of pin assignments of the plurality of circuit pins to the plurality of interface pins;
applying a first objective function to the plurality of pin solutions;
selecting one pin solution of the plurality of pin solutions that satisfies the first objective function; and
specifying in the circuit design, connections between the plurality of circuit pins and the plurality of interface pins according to the one of the plurality of pin solutions.

12. The system of claim 11, wherein the first objective function maximizes a distance between assigned interface pins of the plurality of interface pins, the assigned interface pins being ones of the plurality of interface pins that are assigned to ones of the plurality of circuit pins.

13. The system of claim 11, wherein the memory arrangement is further configured with instructions of the design tool that when executed by the one or more computer processors cause the one or more computer processors to perform operations including:
  assigning by the design tool before generating the plurality of pin solutions, each circuit pin of the plurality of circuit pins to one instance of the plurality of instances of the interface circuit; and
  wherein the generating the plurality of pin solutions includes assigning each circuit pin to an interface pin of the one instance of the interface circuit.

14. The system of claim 11, wherein each instance of the plurality of instances of the interface circuit includes a plurality of groups of interface pins of the plurality of interface pins, and wherein the memory arrangement is further configured with instructions of the design tool that when executed by the one or more computer processors cause the one or more computer processors to perform operations including:
  generating a plurality of group solutions by the design tool before generating the plurality of pin solutions, wherein each group solution includes a set of group assignments and each set of group assignments includes an assignment of each circuit pin of the plurality of circuit pins to one group of the plurality of groups of interface pins of one instance of the plurality of instances of the interface circuit;
  applying a (210) second objective function to the plurality of group solutions by the design tool;
  selecting (210) by the design tool, one group solution of the plurality of group solutions that satisfies the second objective function; and
  wherein the instructions for generating the plurality of pin solutions include instructions for assigning each circuit pin of the plurality of circuit pins to an interface pin of the group of interface pins of the one instance of the plurality of instances of the interface circuit specified in the one group solution.

15. The system of claim 14, wherein the second objective function maximizes a number of groups of the plurality of groups of interface pins of the plurality of instances of the interface circuit having assigned circuit pins.

16. The system of claim 14, wherein the instructions generating the plurality of group solutions include instructions that cause the one or more computer processors to perform operations including:
  identifying each constrained circuit pin of the plurality of circuit pins, wherein each constrained circuit pin has an associated control set; and
  assigning ones of the plurality of circuit pins indicated by the associated control set to the one group of interface pins to which the constrained circuit pin is assigned.

17. The system of claim 11, wherein:
  the plurality of instances of the interface circuit have associated numerical identifiers, and the circuit pin constraints specify for one or more of the plurality of circuit pins a range of the numerical identifiers; and
  the instructions for generating the plurality of pin solutions include instructions for restricting the assignment of each circuit pin of the one or more circuit pins to interface pins of an instance of the plurality of instances of the interface circuit having a numerical identifier in the range of numerical identifiers.

18. The system of claim 11, wherein:
  the plurality of instances of the interface circuit have associated numerical identifiers, and the circuit pin constraints specify for one or more of the plurality of circuit pins, one of the numerical identifiers; and
  the instructions for generating the plurality of pin solutions include instructions for restricting the assignment of each circuit pin of the one or more circuit pins to interface pins of an instance of the plurality of instances of the interface circuit having the one of the numerical identifiers.

19. The system of claim 11, wherein:
the circuit pin constraints restrict one of the circuit pins to a specific pin assignment to one of the interface pins; and
the instructions for generating the plurality of pin solutions include instructions that when executed by the one or more computer processors cause the one or more computer processors to perform operations including:
  determining whether or not the circuit pin constraints indicate the specific pin assignment; and
  limiting the generating of the pin solutions to pins solutions having the specific pin assignment.

20. The system of claim 11, wherein:
the circuit pin constraints specify a first set of restrictions and a second set of restrictions, and possible pin assignments compliant with the first set of restrictions are exclusive of possible pin assignments compliant with the second set of restrictions; and
the instructions for generating the plurality of in solutions include include instructions that when executed by the one or more computer processors cause the one or more computer processors to perform operations including:
  generating a first set of assignments in a pin solution of the plurality of pin solutions by a first execution thread of the design tool, the first set of assignments compliant with the first set of restrictions; and
  generating a second set of assignments in a pin solution of the plurality of pin solutions by a second execution thread of the design tool executing concurrently with the first execution thread, the first set of assignments compliant with the first set of restrictions.

* * * * *